United States Patent [19]

Siol et al.

[11] Patent Number: 5,219,931
[45] Date of Patent: Jun. 15, 1993

[54] THERMOPLASTICALLY PROCESSABLE SOLVENT-RESISTANT POLYMER MIXTURES

[75] Inventors: Werner Siol, Darmstadt-Eberstadt; Thomas Suefke, Rossdorf; Ulrich Terbrack, Reinheim; Reiner Mueller, Biebesheim, all of Fed. Rep. of Germany

[73] Assignee: Roehm GmbH Chemische Fabrik, Darmstadt, Fed. Rep. of Germany

[21] Appl. No.: 485,497

[22] Filed: Feb. 27, 1990

[30] Foreign Application Priority Data

Mar. 4, 1989 [DE] Fed. Rep. of Germany ....... 3907019

[51] Int. Cl.$^5$ ................................................ C08G 63/48
[52] U.S. Cl. ................................... 525/63; 525/326.2; 525/902; 525/72
[58] Field of Search ............... 525/72, 326.2, 902, 525/63

[56] References Cited

U.S. PATENT DOCUMENTS

| | | | |
|---|---|---|---|
| 3,253,060 | 5/1966 | Koblitz et al. | 260/90 |
| 3,458,391 | 7/1969 | Miller | 161/189 |
| 3,914,338 | 10/1975 | Krieg et al. | 260/876 R |
| 3,943,190 | 3/1976 | Abe et al. | 260/876 R |
| 4,868,036 | 9/1989 | Robinet | 428/220 |
| 4,897,449 | 1/1990 | Gaillard et al. | 525/85 |

*Primary Examiner*—John C. Bleutge
*Assistant Examiner*—Randy G. Lakowski
*Attorney, Agent, or Firm*—Oblon, Spivak, McClelland, Maier & Neustadt

[57] ABSTRACT

Thermoplastically processable polymer mixtures with high solvent resistance. The polymer mixtures are made up of A) 2-98 wt. % of a polymer that is composed of at least 80 wt. % of monomer units of $CH_2=CF_2$, and B) 98-2 wt. % of a polymer that consists of ($\alpha$) 20-90 wt. % of monomer units of Formula I $$CH_2=\overset{H}{\underset{|}{C}}-X-R \quad (I)$$

in which R stands for an alkyl group with 1 to 3 carbon atoms and X stands for a $$-O-\overset{O}{\underset{\|}{C}}- \text{ group or a } -\overset{O}{\underset{\|}{C}}-O- \text{ group,}$$

and of ($\beta$) 80-10 wt. % of a chemically crosslinked polymer with a glass transition temperature below 0° C., that is bonded to at least 5 wt. % of the polymer formed from the monomer of Formula (I).

18 Claims, No Drawings

THERMOPLASTICALLY PROCESSABLE SOLVENT-RESISTANT POLYMER MIXTURES

BACKGROUND OF THE INVENTION

1. Field of the Invention

This invention relates to solvent-resistant polymer mixtures that can be processed thermoplastically, containing of mixtures of polymethyl, ethyl, or propyl acrylate, polyvinyl acetate, or polyvinyl propionate, grafted to a chemically crosslinked elastomer with a glass transition temperature <0° C., and polyvinylidene fluoride.

2. Discussion of the Background

The compatibility of polymethyl methacrylate and polyethyl methacrylate with polyvinylidene fluoride (PVDF) in mixtures has been known for a long time. (See S. Noland et al., Polym. Prepr. Amer. Chem. Soc., Div. Polym. Chem. 11, 355 (1970); U.S. Pat. No. 3,253,060). Such mixtures satisfy the criterion of a single glass transition temperature Tg between that of the polymer components, and they also show complete transparency over a broad range of mixtures.

Polyvinylidene fluoride (PVDF) has also been found to be compatible with a large number of different polyvinyl compounds. Thus, mixtures of PVDF with polymethyl acrylate, polyethyl acrylate, polymethyl methacrylate, polyethyl methacrylate, polyvinyl acetate, and polyvinyl methyl ketone were described by D. R. Paul et al. (D. R. Paul et al., Polymer Engineering and Science, 18, No. 16, 1225-1234 (1978)). Compatible mixtures of polymethyl methacrylate with copolymers of vinylidene fluoride and hexafluoroacetone are described by S. Miyata et al. and Maeda et al. (S. Miyata et al., Polym. Propr. Jpn. 34, 1074 (1985), and Maeda et al., U.S. Pat. No. 4,617,350 (1986)). The miscibility of polyvinylidene fluoridehexafluoroacetone copolymers and ethylene-vinyl acetate copolymers is described by Hasegawa (Masatoshi Hasegawa and Saburo Akiyama, Polymer Journal, 20, 471-476 (1988)).

The crystallization behavior of PVDF-PMMA blends is described by various authors (Wendorff et al., Makromol. Chem., Rapid Commun. 7, 591-597 (1986), B. R. Hahn et al., Polymer 28, 201-208 (1987), and J. L. Halary et al., Macromolecules 21, 2988-2994 (1988)).

It has been found empirically that the tendency of PVDF to crystallize decreases clearly when PMMA is added (T. Nishi, T. T. Wang, Macromolecules 8, 909 (1975)). It is assumed that crystalline PVDF dissolves in the amorphous polymethacrylate melt and that the PVDF, now amorphous, acts as a plasticizer for the glassy polymethacrylates (See S. Noland et al. in N. A. Platzer, Multicomponent Polymer Systems, Advances in Chemistry Series 99, American Chemical Society 1971).

Thus, PVDF can be added in rather small proportions to polymethyl methacrylate (PMMA) as a polymeric elasticizer (See U.S. Pat. No. 3,458,391), while conversely, PMMA can be added to PVDF in small amounts as a processing aid (U.S. Pat. No. 3,253,060). Experience shows that no distinct improvement of properties of PMMA is achieved by adding about 2-20 wt. % PVDF to PMMA.

It is possible to obtain blends with improved properties, particularly improved mechanical and optical properties, improved processability, and improved stability by mixing compatible polymers, and blends have already led to a number of commercially successful products (See H. F. Mark et al., Encyclopedia of Polymer Science & Engineering, 2nd Ed., Vol. 12, pp. 399-461, J. Wiley & Sons, New York 1988).

Efforts to utilize the known miscibility between PMMA and PEMA as representatives of acrylate polymers on the one hand, and PVDF on the other, to produce technically advanced products, has so far been less successful. Further, it is desirable to partially substitute a more economical polymeric component for the relatively expensive PVDF by blending, if possible without impairing the favorable properties attributed to PVDF.

SUMMARY OF THE INVENTION

Accordingly, one object of the present invention is to provide thermoplastically processible polymer blends or mixtures having high solvent resistance and prepared from polymers of vinylidene fluoride.

It has now been found that polymers with very good practical properties result when PVDF is blended with polyvinyl esters and polyvinyl acrylates that on the one hand are at least partly grafted to a chemically crosslinked elastomer, and on the other hand have a glass transition temperature <50° C. Mixtures are of particular interest which contain elastomers that show distinctly lower compatibility with PVDF than the polyvinyl esters and polyvinyl acrylates grafted to this elastomer.

DETAILED DESCRIPTION OF THE PREFERRED EMBODIMENTS

In accordance with the invention, thermoplastically processable polymer mixtures are obtained which also contain almost all of the PVDF in crystalline form even with low proportions of PVDF, for example, in the range of 5-20 wt. %. There are even indications that the crystalline proportion of PVDF in all of the PVDF present in the mixture has actually risen in these "blends" in comparison with pure PVDF. The degree of crystallization can be determined by differential scanning calorimetry (DSC). See H. F. Mark et al., Encyclopedia of Polymer Science & Engineering, 2nd Ed., Vol. 4, 488, J. Wiley & Sons 1986. The polymer mixtures pursuant to the invention are distinguished by high mechanical strength and very good solvent resistance.

Properties of special industrial interest are achieved when the polymers grafted to the elastomer represent polymethyl acrylate or polyethyl acrylate, and the tough phase (i.e., the elastomer) to which polymethyl acrylate or polyethyl acrylate contained in the blend is at least partly grafted, is completely incompatible with PVDF.

Therefore, this invention relates particularly to thermoplastically processable polymer mixtures with excellent solvent resistance containing A) 2-98 wt. %, preferably 4-50 wt. % of a polymer that is composed of at least 80 wt. % of the monomer $CH_2=CF_2$, and B) 98-2 wt. %, preferably 96-50 wt. % of a polymer that consists of a) 20-90 wt. % of a monomer of Formula I

in which R stands for an alkyl group with 1 to 3 carbon atoms and X stands for a

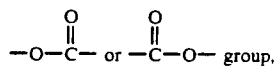

and of

β) 80–10 wt. % of a chemically crosslinked polymer with a glass transition temperature Tg below 0° C., preferably below −10° C., which is covalently bonded, preferably grafted with at least 5 wt. % of the polymer composed of monomers of Formula (I).

According to present knowledge, desirable properties are produced when a typical commercial PVDF is used in the polymer mixtures as the polymeric component A), and particularly when polymers with core-shell structure, especially core-shell polymers prepared by emulsion polymerization, are used as component B).

Known elastomers (latices) are suitable as core material KP with a glass transition temperature <0° C., preferably <−10° C. (Ullmann's Encyclopadie der Technischen Chemie, 4th Edition, Vol. 13, 595–635, Verlag Chemie), especially those selected from the group consisting of polyacrylates, polysiloxanes, polyolefins, especially polybutadienes, polyisoprenes, and ethylene-propylene elastomers (EPM, EPDM, EPTM).

Preferably, the monomers of Formula I are ethyl acrylate, methyl acrylate, propyl acrylate, isopropyl acrylate, vinyl acetate or vinyl propionate, or mixtures of these. It can usually be assumed that the graft components from the monomers of Formula I are compatible with PVDF, i.e., the polymers from the monomers of Formula I should form a compatible polymer melt in the temperature range above the melting point of PVDF up to >200° C., preferably up to >250° C.

Component (A)

Component A by definition is made up of at least 80 and up to 100 wt. % of the monomer 1,1-difluoroethylene.

Polymerization is usually carried out as an emulsion or suspension polymerization in aqueous medium with peroxide catalysis, for example with di-t-butyl peroxide in the temperature range of about 50°–150° C. and at pressures of about 25–150 bar. (Ullmann's Encyclopadie der Technischen Chemie, 4th Edition, Vol. 19, 103–104, Verlag Chemie; H. F. Mark et al., Encyclopedia of Polymer Science and Technology, Vol. 14, 600–616, Wiley Interscience; K. U. Buhler, Spezialplaste, Akademie Verlag, Berlin 1978). The homopolymer PVDF is a highly crystalline polymer with linear molecular structure. The mean molecular weight of the types available on the market is in the range of 100,000 to 300,000, and the melting point is usually in the range of 160°–180° C., particularly 168°–172° C. (DTA). The usable temperature range is considered to be −30° to 150° C.

The solvent, weather, and radiation resistance of PVDF is considered to be particularly good. Powdered grades of PVDF with particle diameters of about 100 microns are also available on the market. Commercial PVDF dispersions can also be used beneficially for blending. Poorly crystallizing copolymers of vinylidene fluoride are therefore less preferable; this applies particularly to copolymers of vinylidene fluoride and hexafluoroacetone.

Component (B)

In a preferred embodiment, emulsion polymerization is used for the preparation of component B (HoubenWeyl, 4th Edition, Vol. XIV/1, 133–194, Georg Thieme Verlag 1961; H. F. Mark et al., Encyclopedia of Polymer Science and Engineering, 2nd Ed., Vol. 6, pp. 1–51, J. Wiley 1986; H. Rauch-Puntigam, Th. Völker, Acryl- and Methacrylverbindungen, Springer Verlag, Berlin 1967). The glass transition temperature of the homopolymers or copolymers prepared from the monomers is well known or can be calculated (Brandrup-Immergut, Polymer Handbook, 2nd Ed., J. Wiley 1975; Vieweg-Esser, Kunstoff Handbuch, Volume IX, pp. 333–340, CarlHanser Verlag 1975).

In a preferred form of this embodiment, the monomers of Formula I are grafted to an elastomer (Bβ)incompatible with component A. Emulsion polymerization deserves special attention here, with the elastomer particle being produced in a first process step, and the polymer (Bα) being grafted to the elastomer in a second step.

Such core-shell latices of the acrylate type can be prepared as component B, for example, by the methods of U.S. Pat. No. 4,199,486, EP 0 065 069, or U.S. Pat. No. 4,710,525 and U.S. Pat. No. 3,787,522, U.S. Pat. No. 3,943,190, U.S. Pat. No. 3,914,338, U.S. Pat. No. 4,052,525, or U.S. Pat. No. 3,985,703.

The construction of the polymer B from a core material and the shell material based on acrylates is achieved in a known manner as follows.

The monomers constituting the core material are polymerized in aqueous emulsion in the first process step. When the monomers of the first step are essentially completely polymerized, the monomer constituents of the shell material are added to the emulsion polymer under such conditions that the formation of new particles is avoided. Because of this, the polymer formed in the second step is deposited around the core material as a shell. A favorable ratio of shell thickness to the size of the core is obtained when the ratio of the weight of core material to that of shell material is 1:3 to 3:1. By suitable choice of the amount of emulsifier, the particle size can be controlled; the smaller the amount of emulsifier, the larger the particles become. The particle diameters, for example, can be in the range of 0.05 to 5 microns In this case, butyl acrylate and 2-ethylhexyl acrylate are preferably used as monomers for the core material. The core material is prepared using monomeric crosslinking agents (monomer), preferably in proportions of 0.1 to 6 wt. %, preferably 0.2 to 3 wt. % based on the monomers constituting the core material.

As usual, compounds that have at least two vinyl double bonds in the molecule are used as crosslinking agents, for example (meth)acrylic esters of polyfunctional alcohols, such as ethylene glycol dimethacrylate, butanediol diacrylate, triethylene glycol dimethacrylate, tetraethylene glycol diacrylate, trimethylolpropane triacrylate, pentaerythritol tetraacrylate, and others. Polymethyl acrylate or polyethyl acrylate are preferably used as the shell material.

In the first polymerization step, in which the core material is formed, 0.1 to 1% by weight of anionic, cationic, or nonionic emulsifier based on the water phase is used, such as sodium lauryl sulfate, alkylbenzene sulfonates, ethoxylation products of alkylated phenols, or their neutralized sulfonation products. The polymerization is initiated preferably at temperatures between about 40° and 100° C. using watersoluble sources of free radicals such as potassium or ammonium persulfate or hydrogen peroxide. Before beginning the second polymerization step, initiator can be added again, but little or even no additional emulsifier is used in the second step.

If desired, the dispersions thus obtained, usually with 30 to 60% solids, can be converted into a dry powder by drying using known methods, for example drying thin layers in shallow containers or on rollers, or preferably by spray drying at temperatures between 50° and 100° C.

The core material in turn can beneficially be "filled" again.

Particularly interesting technical properties are found with an emulsion polymer of the following structure.

Core: Copolymer of butyl acrylate, allyl methacrylate, trimethylolpropane triacrylate, in the weight ratio 98:1:1
Shell: Polymethylacrylate 100 wt. %.

A suitable polymerization component B is obtained by using ethylene-propylene elastomers such as EPDM or EPTM as component $B\beta$.

The ethylene-propylene elastomers usable pursuant to the invention are known per se. See Ullmann's Encyclopadie der Technischen Chemie, 4th Edition, Vol. 13, 619–620, Verlag Chemie 1977; H. F. Mark et al., Encyclopedia of Polymer Science and Engineering, 2nd Ed., Vol. 6, 523–564, J. Wiley & Sons 1986. Ethylene and propylene are usually present in this case in a molar ratio of 5:1 to 1:3. The molecular weight is ordinarily in the range of 200,000 to 500,000. The concomitant use of other α-monoolefins containing up to 16 carbon atoms is also possible. It is also beneficial to copolymerize between 0.1 and 10 mole-% of a linear diene or of an unsaturated, bridged ring hydrocarbon with at least one carbon-carbon double bond, for example unsaturated derivatives of bicyclo(2.2.1)heptane such as 5-alkylidene-2-norbornene, dicyclopentadiene, and bicyclo(2.2.1)heptadiene. In general, the content of double bonds is in the range of 3 to 20 double bonds, preferably from 5 to 12 double bonds per 1000 carbon atoms. EPDM elastomers, for example, are the subject of U.S. Pat. Nos. 2,933,480, 3,211,709, 3,093,620, 3,093,621, 3,113,115, and 3,300,450.

The ethylene-propylene elastomers can be grafted by various methods, for example in organic solvents or in the monomers.

In the first case, for example, ethylene-propylene-diene elastomer (EPDM), for example, the commercial products EPSYN ® 55 (product of the Copolymer Co.), or Polysar ® 585, is used in a suitable solvent such as toluene, chlorobenzene, or butyl acetate.

The procedure is preferably carried out under an inert gas such as nitrogen or carbon dioxide, in the usual polymerization vessels equipped with stirrers. Examples of initiators that can be used are the known peroxide initiators such as benzoyl peroxide, t-butyl peroctanoate, di-t-butyl peroxide, usually in amounts of about 0.01 to 2 wt. % based on the monomers. The polymerization is generally initiated by raising the temperature, for example to above 60° C., and up to the boiling point of the solvent, and may ordinarily also be carried out at elevated temperature. Monomers plus initiator are preferably added in portions to the elastomers in the polymerization vessel. The total polymerization time is usually in the range of several hours, or it can extend over more than one working day. Solvent and unreacted monomer can advantageously be removed under reduced pressure, and especially advantageously using a Leistritz extruder. The grafted fractions can be analyzed by the reprecipitation chromatography technique (J. Ma, D. Pang, & B. Huand, J. Polym. Sci. A, Polym. Chem. 24, 2853–2866 (1986); A. Gadkari & M. F. Farona, Polym. Bull. 17, 299–306 (1987)).

So-called "soluble rubber" can also be used as the elastomer, analogous to EPDM/EPTM.

Also suitable as elastomers $B\beta$ in the context of this invention are:

Butyl rubber (IIE, Ullmann loc. cit., Vol. 13, pp. 621–623; H. F. Mark et al., Encyclopedia of Polymer Science and Engineering, 2nd Ed., Vol. 8, 423–487, J. Wiley & Sons, 1987); polyisoprene (IR, Ullmann loc. cit., Vol. 13, pp. 617–621; H. F. Mark et al., Encyclopedia of Polymer Science and Engineering, 2nd Ed., Vol. 8, 487–564, J. Wiley & Sons, 1987); and polybutadiene (BR, Ullmann loc. cit., Vol. 13, pp. 602–605; H. F. Mark et al., Encyclopedia of Polymer Science and Engineering, 2nd Ed., Vol. 2, 537–590, J. Wiley & Sons, 1987).

Elastomers prepared by polycondensation can also be used, such as silicone rubber (Q, Ullmann loc. cit., Vol. 13, 628–631); H. F. Mark et al., Encyclopedia of Polymer Science & Technology, Vol. 12, 464–569, J. Wiley Interscience).

The mixtures are prepared by known methods, for example by mechanical mixing, preferably of particles that are already reduced in size, or with size reduction during the mixing process and melting of the mixture. Advantageously, the mixing can be done in an extruder. (German Patent Application P 37 43 199.4 of Dec. 19, 1987).

In mechanical mixing, mixtures are first made of the components, preferably starting from substances already in particulate form, usually using slow mixing units such as drum mixers, squirrel cage mixers, or double-chamber blade mixers. The slow mixing units cause mechanical mixing without eliminating the phase boundaries. (Ullmann's Encyclopadie der Technischen Chemie, 4th Edition, Vol. 2, pp. 282–311, Verlag Chemie). The thermoplastic processing is then carried out by homogeneous mixing in the melt, using heated mixing units at suitable temperatures, for example 150 to about 300° C., in kneaders or preferably extruders, for example in a single-screw or multiple-screw extruder, or optionally in extruders with oscillating screws and shear pins (for example in a BUSSCO kneader).

Granulates with uniform particles can be prepared by these procedures (for example, hot cutoffs, cube shape, or round grain shape).

The particle size of the granulates is in the range of 3 to 5 mm. The mixing of dispersions (emulsions) of the constituents followed by removal of the liquid phase, for example by squeezing out in an extruder, represents another preferred embodiment.

The beneficial effects of the mixtures may be described with the example of the method of implementation with PVDF as component A) and a core-shell polymer as component B, i.e., $B\beta$: copolymer prepared from butyl acrylate, allyl acrylate, and trimethylolpropane triacrylate (98:1:1 parts by weight as described above), B: polymethyl acrylate or polyethyl acrylate.

Such a blend of core-shell polymer and PVDF shows high crystallinity of the PVDF fraction even with a low PVDF content. This circumstance may contribute substantially to the observed resistance of the mixtures to solvents. Thus, a blend of 10 wt. % PVDF and 90 wt. % of an emulsion polymer with the composition indicated above is resistant to toluene, acetone, chloroform, and ethyl acetate.

Surprisingly, a distinct improvement of hot dimensional stability is obtained by adding only 10 wt. % to the emulsion polymer mentioned. This is in contradiction to results with PVDF-PMMA blends, in which even a small addition of PVDF distinctly reduces the hot dimensional stability of PMMA.

The balanced presence of all 3 constituents of the polymer mixture is particularly important for the applied technical properties of the polymer mixtures:

A) PVDF or a crystalline vinylidene fluoride copolymer,

Bβ) a vinyl polymer compatible with PVDF with a glass transition temperature <50° C., preferably <30° C., which is at least partly grafted to a third polymeric species incompatible with PVDF, Bβ) with Bβ being incompatible with Bα also in the temperature range of −50° C. to +100° C., being chemically crosslinked, and having a glass transition temperature T<0° C.

Plastic mixtures that contain 4–40 wt. % PVDF are of particular interest. Mixtures that contain 5–30 wt. % PVDF are especially preferred. The proportion of the component Bβ in the component B is preferably in the range of 40–90, and it is very particularly preferred for it to be in the range of 55–75 wt. %.

Plastic mixtures that consist of 75–95 wt. % PVDF as component A and 25–5 wt. % of component B are also of interest, with a proportion of 55–75 wt. % of component Bβ in B being preferred here also.

The melt viscosity ($\eta_s$) is determined according to DIN 54 811 Procedure B.

The particle diameter is determined with a Coulter ® Nano-Sizer. The particle diameter can also be determined by light scattering.

The elongation at failure and the tensile strength are determined according to DIN 53 455.

The Shore hardness is determined by the method of DIN 53 505.

Having generally described this invention, a further understanding can be obtained by reference to certain specific examples which are provided herein for purposes of illustration only and are not intended to be limiting unless otherwise specified.

EXAMPLES

Example 1—Preparation of an Emulsion Polymer with Core-Shell Structure (Component B)

In a polymerization flask with stirrer, reflux condenser and thermometer are placed

```
1.0 g  potassium persulfate as initiator, and
0.06 g sulfated triisobutylphenol, ethoxylated
       with 7 moles ethylene oxide, sodium salt,
       as emulsifier in
630.0 g distilled water, and the mixture is heated
       to 80° C.
```

Into this mixture is metered uniformly with stirring over a period of 2 and ½ hours an emulsion I, consisting of:

```
1631.0 g butyl acrylate,
  16.6 g allyl methacrylate,
  16.6 g propanetrimethylol triacrylate,
   3.0 g potassium persulfate,
   5.0 g of the emulsifier described above, and
```

-continued

```
1877.0 g distilled water
```

A sample is taken for analysis; the polymer dispersion thus prepared has a particle diameter of 346 nm.

Fed into Emulsion I immediately thereafter over a period of 1 and ½ hours at 80° is an Emulsion II, consisting of:

```
900.0 g methyl acrylate
  2.0 g potassium persulfate
  1.5 g of the emulsifier described above and
1345.0 g distilled water.
```

After cooling to room temperature, a polymer dispersion with a solids content of 39.8% is obtained. Particle diameter: 386 nm.

To obtain the solid polymer, the dispersion is frozen for 48 hours at −16° C. After thawing, the solid is separated, washed three times with water, and dried at 50° C. under vacuum.

Example 2

The procedure was the same as in Example 1, but a different composition of Emulsion I was chosen:

```
1648.0 g butyl acrylate
   8.3 g allyl methacrylate
   8.3 g trimethylolpropane triacrylate
   1.6 g potassium persulfate,
   5.0 g of the emulsifier described in Example 1,
1877.0 g distilled water.
```

Diameter of the polymer dispersion after adding Emulsion II: 446 nm. Solids content of the dispersion: 40 wt. %. Processing to obtain the solid polymer was the same as in Example 1.

Example 3

The procedure was the same as in Example 2, but a different composition of monomers in Emulsion I was chosen:

```
1597.0 g butyl acrylate
  33.3 g allyl methacrylate
  33.3 g trimethylolpropane triacrylate.
```

After adding Emulsion II, a polymer dispersion was obtained with a particle diameter of 448 nm.

Example 4—Preparation and characterization of the plastic mixtures

```
Component A:  PVDF
Component B:  Emulsion polymer with core-shell
              structure
Component Bβ: Polybutyl acrylate crosslinked
              with 1% allyl methacrylate and 1%
              trimethylolpropane triacrylate.
Component Bα: Polymethyl acrylate, partly
              grafted to Bβ.
```

PVDF (Solef ® 1010 from Solvay Co.) is mixed in different proportions with the solid polymer from Example 1 in an extruder (see Table 1).

In addition to the content of PVDF in the polymer mixture, Table 1 also shows, for each case, the lowest glass transition temperature determined by DSC and the melting peak ($T_{max}$) of the PVDF contained in the mixture, the heat of melting (J/g) of the mixture and the heat of melting (J/g) of PVDF.

TABLE 1

Characterization of the polymer Mixture of PVDF and Polymer of Example 1

| No. | Fraction of PVDF in mixture (wt. %) | Tg (Elastomer) (°C.) | $T_{max}$ (°C.) | Heat of melting J/g mixture | Heat of melting J/g PVDF |
|---|---|---|---|---|---|
| 4-a | 100 | (−40) | 192 | 57.0 | 57.0 |
| 4-b | 80 | −43 | 181 | 36.0 | 46.0 |
| 4-c | 50 | −45 | 176 | 33.4 | 66.9 |
| 4-d | 20 | −46 | 170 | 13.8 | 68.9 |
| 4-e | 10 | −43 | 163 | 6.4 | 64.3 |
| 4-f | 5 | −44 | 155 | 2.4 | 47.0 |
| 4-g | — | −40 | — | — | — |

As can be seen, the heat of melting of PVDF in blends with only 10–20% PVDF is also about the same, if not greater than in PVDF itself, i.e., the PVDF is present largely in crystalline form in the polymer mixture.

The mixtures 4-b to 4-f can be processed excellently by thermoplastic methods. 4-d (20 wt. % PVDF) at 180° C. shows an $\eta_s$ of 1925 Pa s. This material also can be extruded to form a smooth, unwavy, bubblefree strand.

The tensile strength and elongation at failure were measured on the strands:

|  | Sample 4-d | Sample 4-e |
|---|---|---|
| Tensile strength MPa | 5.2 | 3.1 |
| Elongation at failure (%) | 200 | 180 |

Test wafers were injection molded from the mixtures 4-d and 4-e. Wafers with good solvent resistance to toluene and acetone are obtained (especially sample 4-d).

| Shore hardness A of the samples: | 4-d: | 71 |
|---|---|---|
|  | 4-e: | 59 |

Examples 5a,b—Mixtures with a high content of PVDF

(80) 90 wt. % PVDF (Solef ® 1010 from Solvay Co.) is mixed with (20) 10 wt. % of the solid polymer from Example 2, granulated, and then injection molded into test specimens.

Sample 5a, 90 wt. % PVDF:
VST (° C.):130
Impact strength (standard small bar): no fracture
Notched impact strength (standard small bar): 28.9 KJ/m²s Sample 5b, 80 wt. % PVDF:
VST (° C.): 100
Impact strength (standard small bar): no fracture
Notched impact strength (standard small bar): 39.7 KJ/m² S.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastically processible polymer mixture having high solvent resistance, comprising A) 2–98 wt. % of a polymer comprising at least 80 wt. % of monomer units of the formula $CH_2=CF_2$, and B) 98–2 wt. % of a polymer consisting essentially of (α) 20–90 wt. % of monomer units of Formula I $$CH_2=\underset{\underset{H}{|}}{C}-X-R \qquad (I)$$

wherein R is a $C_{1-3}$ alkyl group, and X is a —C(O)—O— group, and (β) 80–10 wt. % of a chemically crosslinked polymer having a glass transition temperature below 0° C., wherein said chemically crosslinked polymer is covalently bonded to at least 5 wt. % of polymer d.

2. The polymer mixture of claim 1, comprising 5–50 wt. % of polymer A and 95–50 wt. % of polymer B.

3. The polymer mixture of claim 1, wherein said chemically crosslinked polymer is selected from the group consisting of elastomeric polyacrylates, polysiloxanes and polyolefins.

4. The polymer mixture of claim 3, wherein said polyolefin is a polybutadiene, polyisoprene or ethylene-propylene elastomer.

5. The polymer mixture of claim 1, wherein polymer B is a core-shell polymer.

6. The polymer mixture of claim 1, wherein polymer B is prepared by emulsion polymerization.

7. The polymer mixture of claim 1, wherein said monomer of Formula I is selected from the group consisting of ethyl acrylate, methyl acrylate, propyl acrylate, isopropyl acrylate and mixtures thereof.

8. The polymer mixture of claim 1, wherein polymer A comprises 100 wt. % monomer units of $CH_2=CF_2$.

9. The polymer mixture of claim 5, wherein the ratio of the weight of the core to the weight of the shell of said core-shell polymer is 1:3 to 3:1.

10. The polymer mixture of claim 5, wherein the core of said core-shell polymer comprises 0.1–6 wt. % of a crosslinking monomer based on the monomers comprising the core.

11. The polymer mixture of claim 10, wherein said core comprises 0.2–3 wt. % of a crosslinking monomer.

12. The polymer mixture of claim 5, wherein the core of said core-shell polymer comprises butyl acrylate and 2-ethylhexyl acrylate.

13. The polymer mixture of claim 5, wherein the core of said core-shell polymer comprises butyl acrylate, allyl methacrylate and trimethylolpropane triacrylate, and the shell of said core-shell polymer comprises polymethyl acrylate or polyethyl acrylate.

14. The polymer mixture of claim 1, wherein said chemically crosslinked polymer comprises an ethylene-propylene elastomer.

15. The polymer mixture of claim 14, wherein said elastomer comprises ethylene and propylene in a molar ratio of 5:1 to 1:3.

16. The polymer mixture of claim 14, wherein said elastomer further comprises 0.1–10 mol % of a copolymerizable linear diene or an unsaturated bridged ring hydrocarbon containing one or more carbon-carbon double bonds.

17. The polymer mixture of claim 1, comprising 5–30 wt. % of polymer A and wherein polymer B comprises 55–75 wt. % of monomer units of Formula I.

18. The polymer mixture of claim 1, comprising 75–95 wt. % polymer A and wherein polymer B comprises 55–75 wt. % of monomer units of Formula I.

* * * * *